(12) United States Patent
Yao et al.

(10) Patent No.: US 9,430,105 B2
(45) Date of Patent: Aug. 30, 2016

(54) FREQUENCY INDEPENDENT OFFSET CANCELLATION SCHEME IN TOUCH RECEIVER CHANNEL

(71) Applicant: Apple Inc., Cupertino, CA (US)

(72) Inventors: Weijun Yao, San Jose, CA (US); Taif A. Syed, Cupertino, CA (US); Yingxuan Li, Saratoga, CA (US); Ahmad Al-Dahle, Santa Clara, CA (US)

(73) Assignee: Apple Inc., Cupertino, CA (US)

(\*) Notice: Subject to any disclaimer, the term of this patent is extended or adjusted under 35 U.S.C. 154(b) by 199 days.

(21) Appl. No.: 14/194,363

(22) Filed: Feb. 28, 2014

(65) Prior Publication Data

US 2015/0227232 A1   Aug. 13, 2015

Related U.S. Application Data

(60) Provisional application No. 61/937,341, filed on Feb. 7, 2014.

(51) Int. Cl.
  *G06F 3/044* (2006.01)
  *G06F 3/041* (2006.01)
  *G06F 3/047* (2006.01)

(52) U.S. Cl.
  CPC .............. *G06F 3/044* (2013.01); *G06F 3/0418* (2013.01); *G06F 3/047* (2013.01); *G06F 2203/04101* (2013.01); *G06F 2203/04112* (2013.01)

(58) Field of Classification Search
  CPC .................. G06F 3/044; G06F 3/045; G06F 2203/04107–2203/04113; G06F 3/047; G06F 3/418
  USPC ......................................................... 345/174
  See application file for complete search history.

(56) References Cited

U.S. PATENT DOCUMENTS 5,053,757 A \* 10/1991 Meadows ............... G06F 3/044
                                                           341/22
5,483,261 A   1/1996 Yasutake
(Continued)

FOREIGN PATENT DOCUMENTS

JP   2000-163031 A   6/2000
JP   2002-342033 A   11/2002

OTHER PUBLICATIONS

Kim, H. et al. (Feb. 8, 2010). "A Mobile-Display-Driver IC Embedding a Capacitive-Touch-Screen Controller System," IEEE International Solid-State Circuits Conference, Samsung Electronics, Yongin, Korea, three pages.

(Continued)

*Primary Examiner* — Julie Anne Watko
(74) *Attorney, Agent, or Firm* — Morrison & Foerster LLP

(57) ABSTRACT

A self-capacitance touch sensor panel including a plurality of touch electrodes and one or more sense circuits coupled to the touch electrodes. The touch sensor panel also includes at least one offset cancellation circuit coupled to at least one of the touch electrodes and configured to generate an offset cancellation signal to cancel an offset signal at the at least one touch electrode. In some examples, the offset cancellation signal can be an offset cancellation current to cancel an offset current. In some examples, the offset cancellation circuit comprises a variable resistor, and a magnitude of the offset cancellation current is based on a resistance of the variable resistor. In some examples, each touch electrode is coupled to an offset cancellation circuit. In other examples, a single offset cancellation circuit is shared by a plurality of touch electrodes.

17 Claims, 9 Drawing Sheets

(56) References Cited

U.S. PATENT DOCUMENTS

| | | | |
|---|---|---|---|
| 5,488,204 | A | 1/1996 | Mead et al. |
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 * | 2/2010 | Hotelling ............... G06F 3/0416 178/18.01 |
| 7,986,193 | B2 * | 7/2011 | Krah ..................... G06F 3/0418 331/17 |
| 8,350,826 | B2 | 1/2013 | Watanabe |
| 8,479,122 | B2 | 7/2013 | Hotelling et al. |
| 8,610,443 | B1 | 12/2013 | Ryshtun et al. |
| 8,786,295 | B2 * | 7/2014 | Chandra ................ G06F 3/044 324/686 |
| 2006/0197753 | A1 | 9/2006 | Hotelling |
| 2008/0309622 | A1 * | 12/2008 | Krah ..................... G06F 3/0418 345/173 |
| 2010/0085322 | A1 * | 4/2010 | Mamba .................. G06F 3/044 345/173 |
| 2010/0315363 | A1 * | 12/2010 | Kobayashi ............. G06F 3/044 345/173 |
| 2013/0038338 | A1 * | 2/2013 | Lipasti .................... G06F 3/044 324/658 |
| 2013/0285971 | A1 * | 10/2013 | Elias ...................... G06F 3/044 345/174 |
| 2013/0285973 | A1 * | 10/2013 | Elias ...................... G06F 3/044 345/174 |
| 2015/0035787 | A1 * | 2/2015 | Shahparnia ............. G06F 3/044 345/174 |
| 2015/0185951 | A1 * | 7/2015 | Akai ..................... G06F 3/0418 345/174 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

FREQUENCY INDEPENDENT OFFSET CANCELLATION SCHEME IN TOUCH RECEIVER CHANNEL

FIELD OF THE DISCLOSURE

This relates generally to a self-capacitive touch sensor panel in which each sense channel can be connected to a frequency independent offset cancellation circuit in order to mitigate phase and amplitude offsets that may arise in a touch signal due to various system parasitics.

BACKGROUND OF THE DISCLOSURE

Many types of input devices are available for performing operations in a computing system, such as buttons or keys, mice, trackballs, joysticks, touch sensor panels, touch screens, and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens generally allow a user to perform various functions by touching (i.e., physical contact or near-field proximity) the touch sensor panel using a finger, stylus or other object at a location often dictated by a user interface (UI) being displayed by the display device. In general, touch screens can recognize a touch event and the position of the touch event on the touch sensor panel, and the computing system can then interpret the touch event in accordance with the UI appearing at the time of the touch event, and thereafter can perform one or more actions based on the touch event.

Self-capacitance touch sensor panels can be formed from a plurality of conductive electrodes of a substantially transparent conductive material such as Indium Tin Oxide (ITO). Self-capacitance touch sensor panels can detect both touch events as well as proximity events in which a user or object is not touching the panel but is proximal to it. However, self-capacitance touch sensor panels can be susceptible to parasitic offset sources.

SUMMARY OF THE DISCLOSURE

This relates to a self-capacitance touch sensor panel in which at least one electrode of the touch sensor panel can be coupled to a frequency independent offset cancellation circuit. In some examples, each individual electrode of the touch sensor panel can be coupled to a common frequency independent offset cancellation circuit. The cancellation circuit can produce a current that can be used by each individual electrode to cancel offset currents generated by parasitic capacitances that may be coupled to the electrode. The amount of current provided to each individual electrode can be controlled via variable resistors that can be coupled to each electrode, wherein the amount of resistance that each variable resistor provides can be empirically determined.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some touch screen can include self-capacitance touch sensor panels. Self-capacitance touch sensor panels can detect both touch events as well as proximity events in which a user or object is not touching the panel but is proximal to it. However, self-capacitance touch sensor panels can be susceptible to parasitic offset capacitances. Accordingly, the disclosure relates to a self-capacitance touch sensor panel that can utilize a frequency independent offset cancellation circuit to minimize an amount of signal offset caused by parasitic and ambient sources that can be seen by the touch sensor panel.

Figure 1:
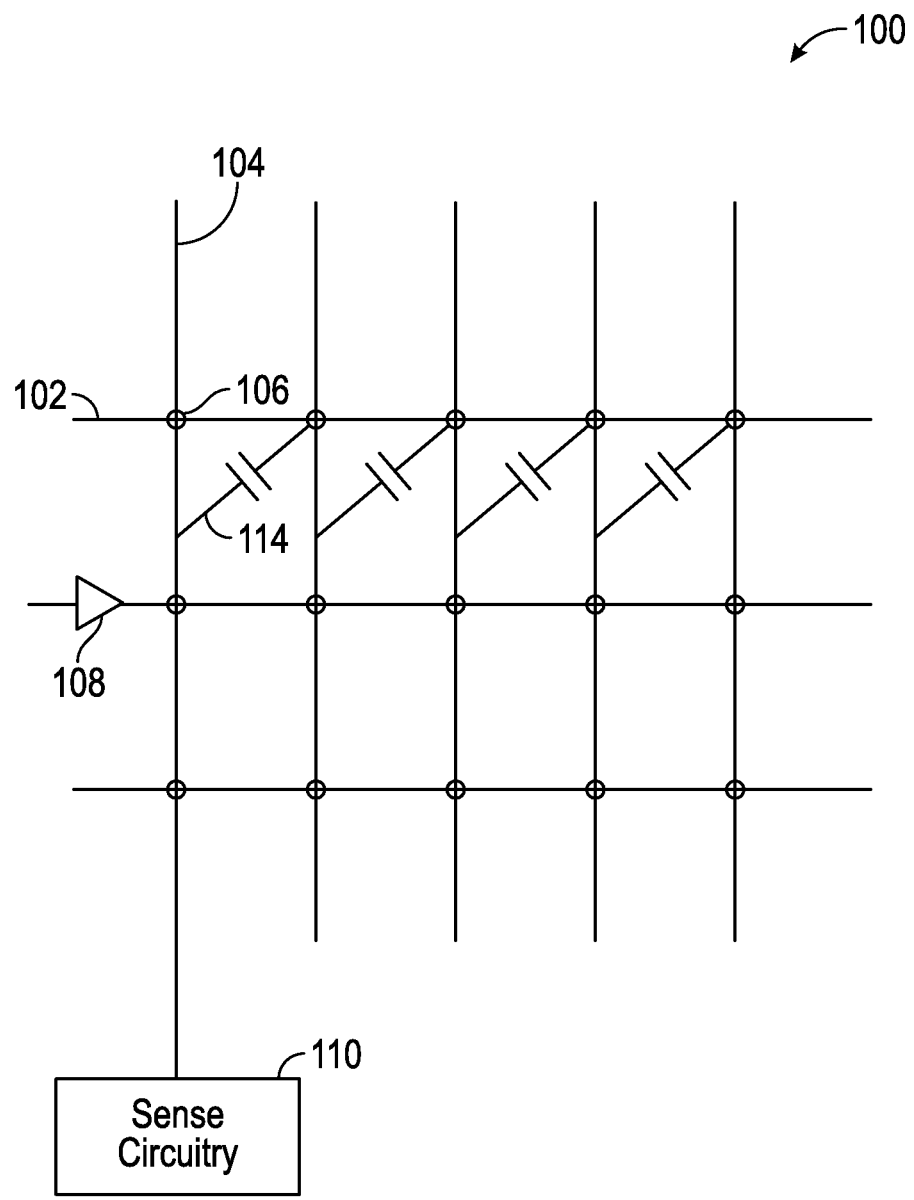
FIG. 1 illustrates an exemplary mutual-capacitance touch sensor panel according to examples of the disclosure.

FIG. 1 illustrates an exemplary mutual-capacitance touch sensor panel 100 according to some examples of the disclosure. Touch sensor panel 100 can include an array of touch nodes 106 that can be formed by a two-layer electrode structure separated by a dielectric material, although in some examples the electrodes can be formed on the same layer. One layer of electrodes can include a plurality of drive lines 102 positioned perpendicularly to another layer of electrodes comprising a plurality of sense lines 104, with each of the nodes 106 having an associated mutual capacitance 114 (also referred to as coupling capacitance). It is noted that in some examples, the drive lines 102 and sense lines 104 can be positioned in non-orthogonal arrangements. The drive lines 102 and sense lines 104 can cross over each other in different planes separated from one another by a dielectric. Each point at which a drive line 102 intersects a sense line 104 can correspond to a touch node 106. Thus, for example, a panel that contains 20 drive lines 102 and 15 sense lines 104 can have 300 touch nodes available to detect touch or proximity events.

Drive lines 102 (also referred to as rows, row traces, or row electrodes) can be activated by a stimulation signal provided by respective drive circuits 108. Each of the drive circuits 108 can include an alternating current (AC) or unipolar pulsatile voltage source referred to as a stimulation signal source. To sense touch events on the touch sensor panel 100, one or more of the drive lines 102 can be stimulated by the drive circuits 108, and the sense circuitry 110 can detect the resulting change in the charge coupled onto the sense lines 104 in the form of a change in the amplitude of the coupled stimulation signal. The change in voltage amplitude values can be indicative of a finger or conductive object touching or in proximity to the panel. The detected voltage values can be representative of touch node output values, with changes to those output values indicating the node location(s) where the touch or proximity events occur and the amount of touch that occurs at those location (s).

Figure 2:
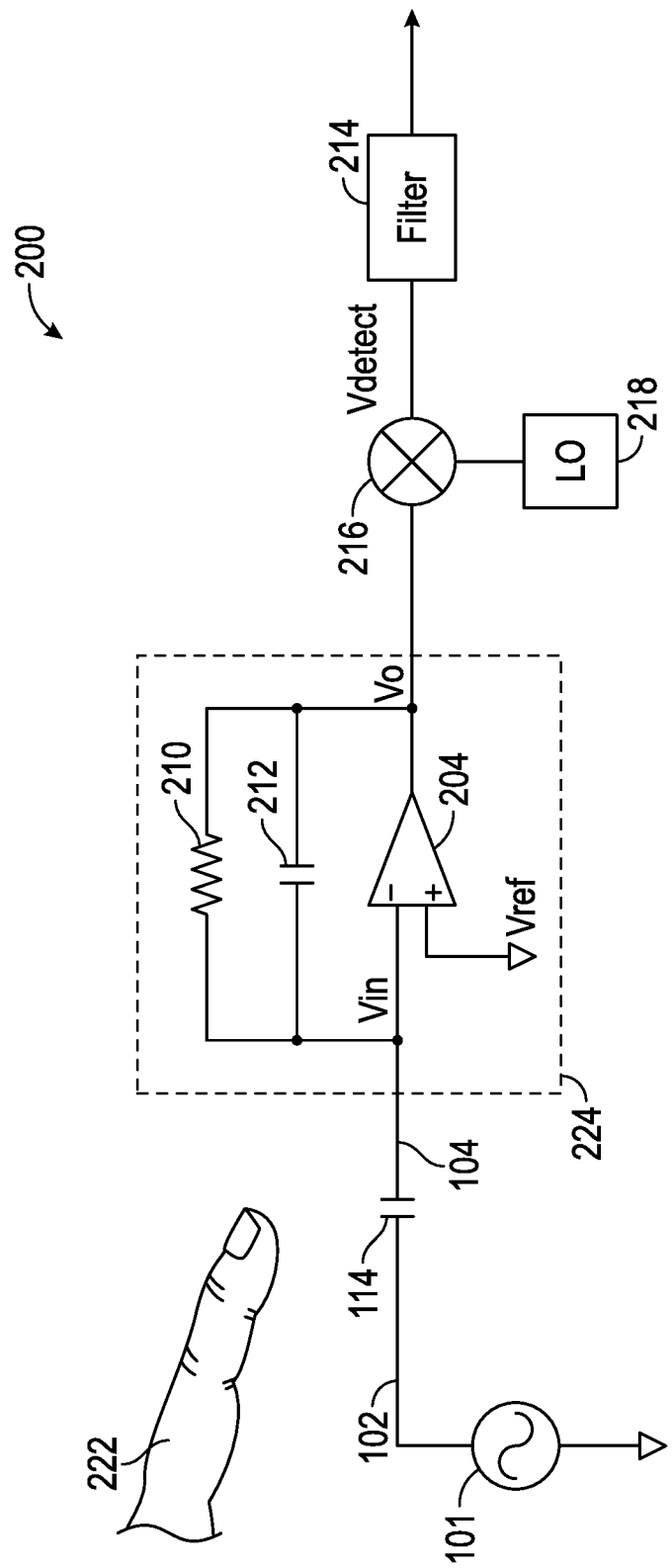
FIG. 2 illustrates an exemplary electrical circuit corresponding to a mutual-capacitance touch sensor sense line according to examples of the disclosure.

FIG. 2 illustrates an exemplary electrical circuit 200 corresponding to a mutual-capacitance touch sensor sense line according to examples of the disclosure. Drive line 102 can be stimulated by stimulation signal 101. Stimulation signal 101 can be capacitively coupled to sense line 104 through mutual capacitance 114 between drive line 102 and the sense line. When a finger or object 222 approaches the touch node created by the intersection of drive line 102 and sense line 104, mutual capacitance 114 can be altered. This change in mutual capacitance 114 can be detected to indicate a touch or proximity event. The sense signal coupled onto sense line 104 can then be received by sense amplifier 224. Sense amplifier 224 can include operational amplifier 204 and at least one of a feedback resistor 210 and a feedback capacitor 212. FIG. 2 is shown for the general case in which both resistive and capacitive feedback elements are utilized. The sense signal can be inputted into the inverting input (referred to as Vin) of operational amplifier 204, and the non-inverting input of the operational amplifier can be tied to a reference voltage Vref. Operational amplifier 204 can adjust its output voltage Vo to keep Vin substantially equal to Vref, and can therefore keep Vin constant or virtually grounded so as to reject any stray capacitances or any change thereof. Therefore, the gain of sense amplifier 224 can be mostly a function of the ratio of mutual capacitance 114 and the feedback impedance, comprised of resistor 210 and capacitor 212. The output of sense amplifier 224 Vo can be further filtered and heterodyned or homodyned by being fed into multiplier 216, and multiplied with local oscillator 218 to produce Vdetect. One skilled in the art will recognize that the placement of filter 214 can be varied; thus, the filter can be placed after multiplier 216, as illustrated, or two filters can be employed—one before the multiplier and one after the multiplier. In some examples, there can be no filter at all. The direct current (DC) portion of Vdetect can be used to determine if a touch or proximity event has occurred.

Figure 3:
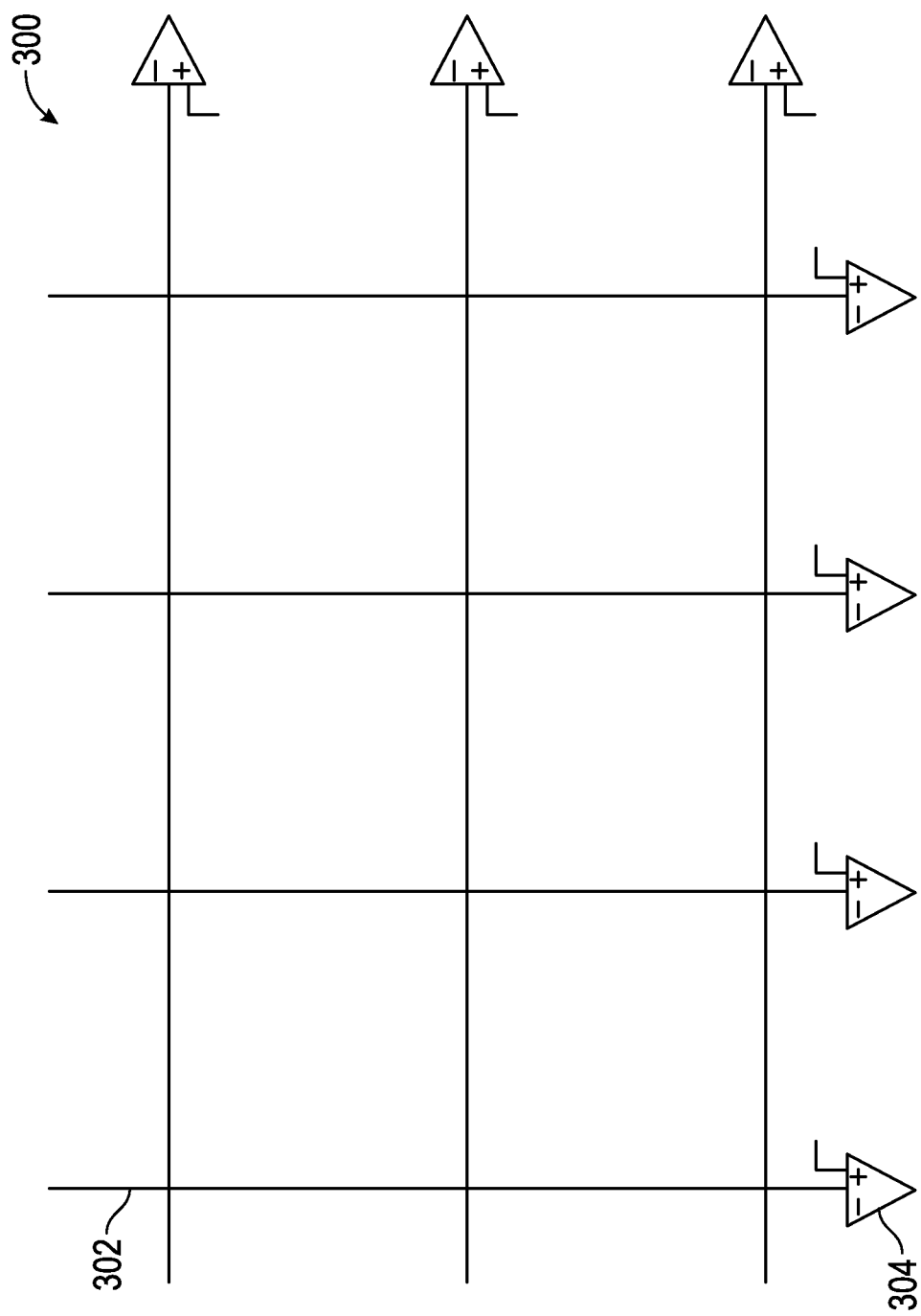
FIG. 3 illustrates an exemplary self-capacitance touch sensor panel circuit according to examples of the disclosure.

In some examples, mutual-capacitance touch sensor panels can be configured to operate as self-capacitance touch sensor panels. Touch sensor panels that employ self-capacitance to detect touch or proximity events can be used to detect the presence of a finger or object that is relatively far away from the touch sensor panel—in some examples, further away than a mutual-capacitance panel can detect. FIG. 3 illustrates an exemplary self-capacitance touch sensor panel circuit 300 according to examples of the disclosure. Self-capacitive touch sensor panel circuit 300 can contain electrodes 302, which can be connected to sense circuitry 304 and can have a self-capacitance to ground. When an object touches or is in close proximity to electrode 302, an additional capacitance can be formed between the electrode and ground through the object, which can increase the self-capacitance of the electrode. This change in the self-capacitance of electrode 302 can be detected by sensing circuit 304. Objects or fingers that are relatively far away from the touch panel can cause such changes in self-capacitance, whereas mutual-capacitance touch panels can require fingers or objects to be either touching or in near proximity to the panel in order to sense a touch or proximity event. Unlike mutual-capacitance touch sensor panel 100, each electrode 302 of circuit 300 can act as a touch node, rather than touch nodes comprising intersections of orthogonal electrodes. Thus, in a 20×15 electrode array, there can be 35 touch nodes. Although FIG. 3 shows one sense circuit 304 coupled to each electrode 302, in other examples fewer sense circuits 304 can be utilized and multiplexed for coupling to the electrodes 302.

Figure 4:
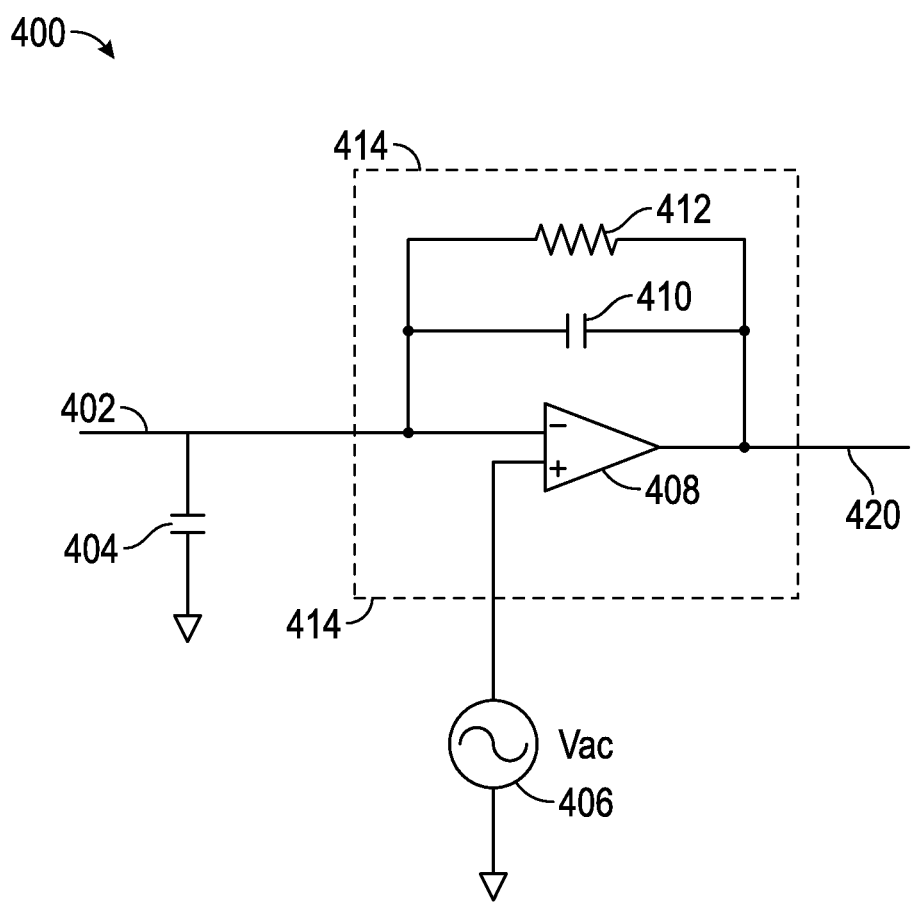
FIG. 4 illustrates an exemplary electrical circuit corresponding to a self-capacitance touch sensor electrode according to examples of the disclosure.

FIG. 4 illustrates an exemplary electrical circuit 400 corresponding to a self-capacitance touch sensor electrode 402 and sensing circuit 414 according to examples of the disclosure. Touch electrode 402 can have a self-capacitance 404 to ground associated with it. Touch electrode 402 can be coupled to sensing circuit 414. Sensing circuit 414 can include operational amplifier 408, feedback resistor 412, feedback capacitor 410 and input voltage source 406, although other configurations can be employed. For example, feedback resistor 412 can be replaced by a switched capacitor resistor in order to minimize any parasitic capacitance effects that may be caused by a variable feedback resistor. Touch electrode 402 can be coupled to the inverting input of operational amplifier 408. An AC voltage source 406 (Vac) can be coupled to the non-inverting input of operational amplifier 408. Touch sensor circuit 400 can be configured to sense changes in self-capacitance 404 induced by a finger or object touching or in proximity to touch electrode 402. Output 420 of touch sensor circuit 400 can be used to determine the occurrence of a touch or proximity event. In some examples, output 420 can be analyzed by a processor to determine the occurrence of the touch or proximity event, or the output can be inputted into a discrete logic network to determine the occurrence of the touch or proximity event.

Figure 5:
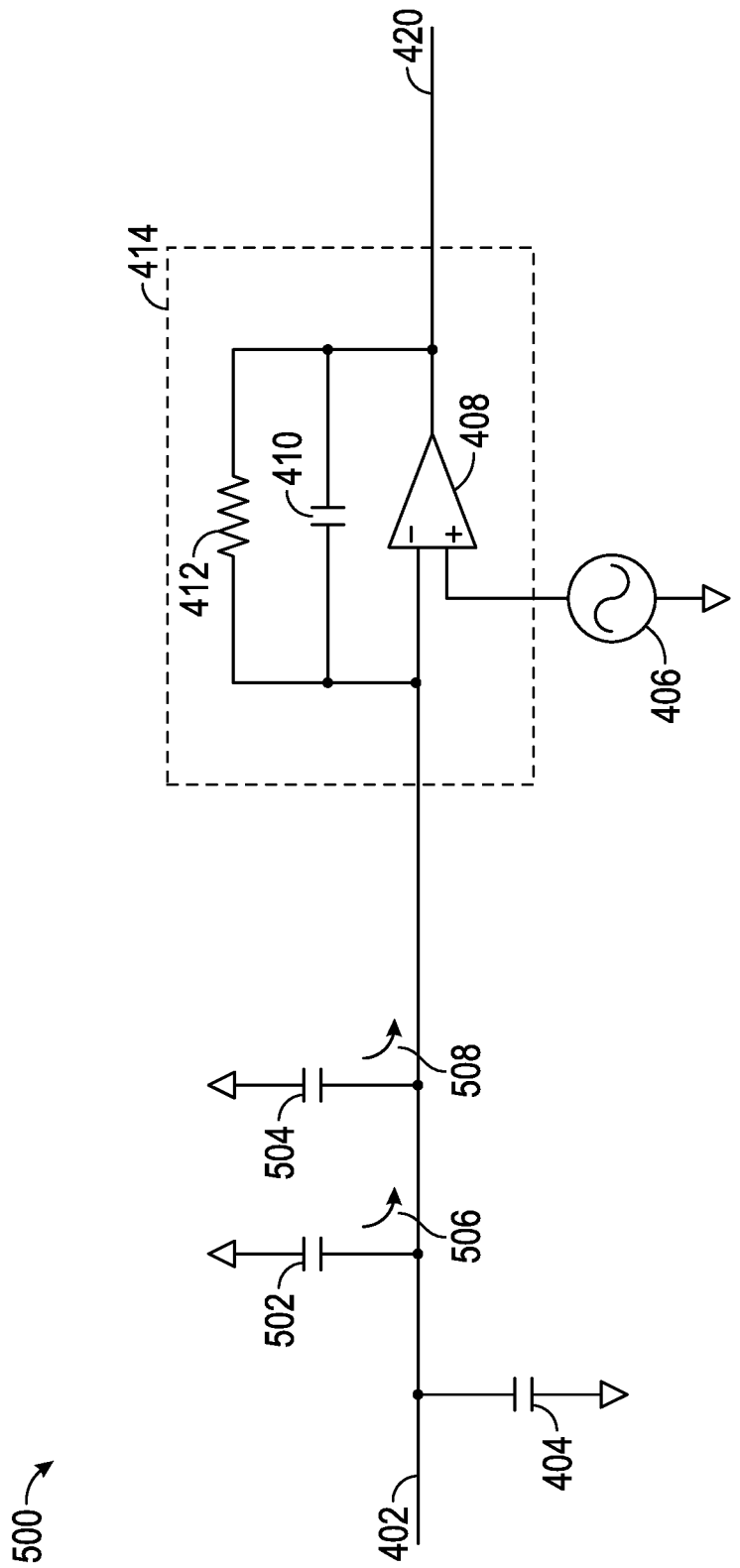
FIG. 5 illustrates an exemplary circuit representation of a self-capacitance touch sensor electrode according to examples of the disclosure.

FIG. 5 illustrates an exemplary circuit 500 representation of a self-capacitance touch sensor electrode 402 according to examples of the disclosure. Circuit 500 illustrates the same electrode of FIG. 4; however, the circuit also contains capacitances 502 and 504. Capacitance 502 (the touch capacitance) can represent an additional electrode-to-ground capacitance created when a user who is at least partially grounded touches (either with a finger or other object) or is in close proximity to electrode 402. Capacitance 504 (the offset capacitance) can represent an electrode-to-ground capacitance created by parasitic sources such as a display or other electronics proximal to electrode 402. In some examples, capacitance 504 (the offset capacitance) can be much larger than capacitance 404 (the self-capacitance associated with electrode 402, absent any parasitic or touch-related effects). Accordingly, it is understood that although capacitances 404 and 504 are illustrated as being separate capacitances, in some examples, they may equivalently be represented by a single capacitance.

As described below, capacitance 504 can introduce an offset signal, in this case offset current 508, into electrode 402. During touch detection, capacitance 502 can be regarded as the capacitance of interest, while capacitance 504 can be regarded as an offset source. During operation of circuit 500, when a user touches or comes into close proximity to electrode 402, the self-capacitance of the electrode can be altered by touch capacitance 502. The alteration of the self-capacitance of electrode 402 can result in current 506 to flow towards sense circuit 414. The flow of current 506 can be detected by sense circuit 414, and a touch can thus be detected. However, offset capacitances such as 504 can cause current 508 to also flow to sense circuit 414, which can also be detected by the sense circuit. The presence of offset capacitance 504, and thus current 508, can therefore lead to a degradation in the dynamic range of circuit 500, especially if the magnitude of the offset current is equal to or greater than that of the touch current 506.

Mitigating or eliminating the effects of offset current 508 can increase the dynamic range of the self-capacitance panel according to examples of this disclosure. One method for mitigating or eliminating offset current 508 can be to create an opposite but equal magnitude current flow (i.e., "offset cancellation current") that can cancel the offset current flowing into sense circuit 414. By creating an opposite but equal (in magnitude) current flow to that of offset current 508, the offset current can essentially be cancelled out, thus leaving only touch current 506 to be detected. Elimination or reduction of offset current 508 can result in the offset being minimized while the signal can remain constant, thus maximizing the dynamic range of the system. While the disclosure is presented in terms of offset currents and offset cancellation currents, it is understood that the disclosure is not so limited and encompasses offset and offset cancellation signals other than currents.

Figure 6:
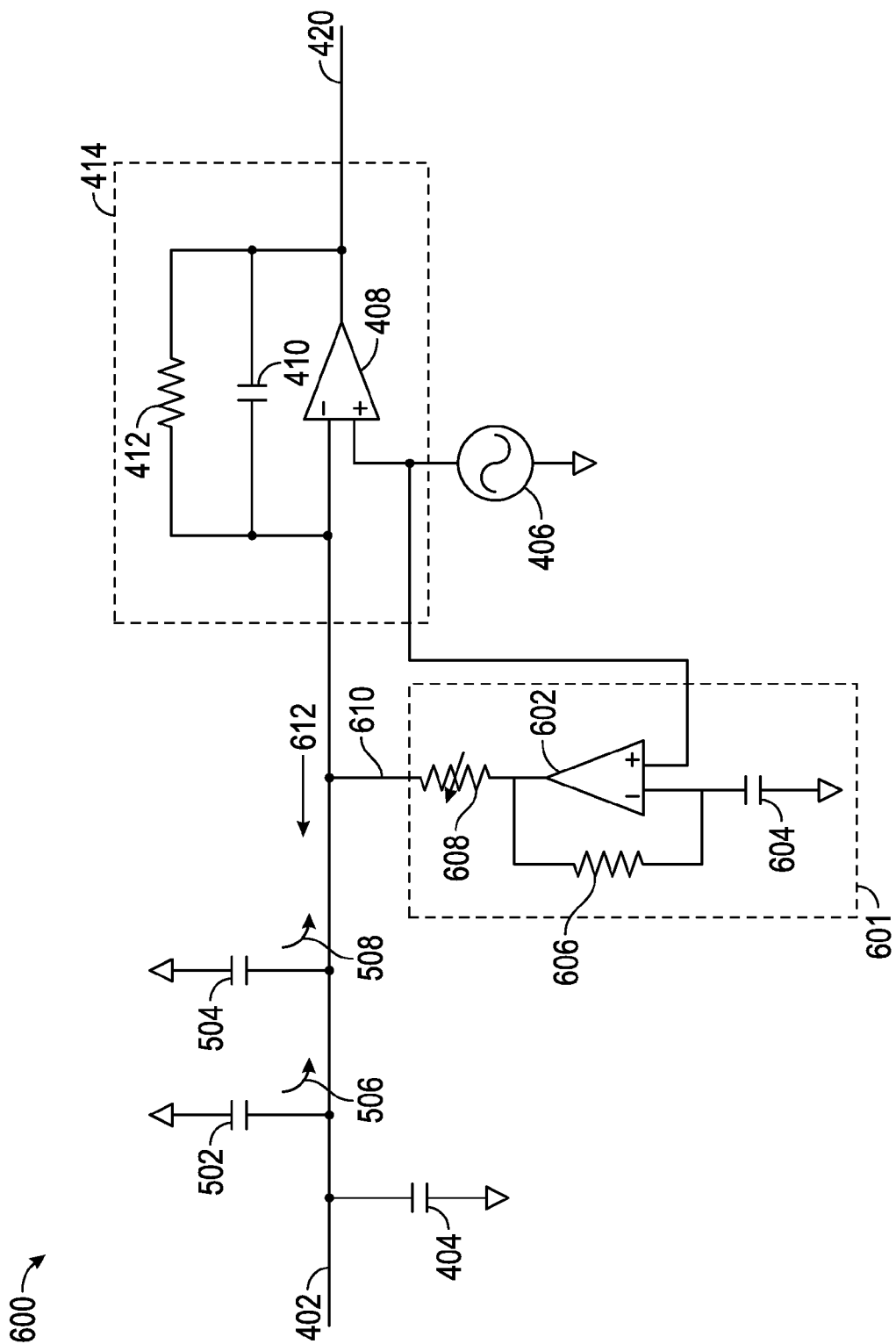
FIG. 6 illustrates an exemplary self-capacitance touch sensor electrode circuit with a frequency independent offset cancellation circuit according to examples of the disclosure.

FIG. 6 illustrates an exemplary self-capacitance touch sensor electrode circuit 600 with a frequency independent offset cancellation circuit 601 according to examples of the disclosure. Offset cancellation circuit 601 can include operational amplifier 602. Operational amplifier 602 can be coupled to a stimulation source at its non-inverting input. In the example of FIG. 6, amplifier 602 is illustrated as being coupled to stimulation source 406 that is also used by sense circuit 414. The disclosure, however, is not so limited and the stimulation source coupled to amplifier 602 can be, for example, a stand-alone voltage source. The inverting input of amplifier 602 can be connected to capacitor 604. It is understood that capacitor 604 could alternatively be a resistor, and offset cancellation circuit 601 could perform similarly as described here. Feedback resistor 606 can provide a feedback path between the inverting input of amplifier 602 and output 610 of circuit 601. Variable resistor 608 can also be coupled to output 610, as illustrated. Variable resistor 608 can be adjusted so that current 612 generated by offset cancellation circuit 601 can equal offset current 508 produced by offset capacitance 504. In this way, offset cancellation circuit 601 can be tuned to essentially cancel offset current 508, thus leaving substantially only current 506 generated by touch capacitance 502 to be detected by sense circuit 414.

In the absence of parasitic offset capacitances, the transfer function of circuit 600 can be characterized by the following equation:

$$V_s^* \, C_{sig}/C_{fb} \tag{1}$$

where Vs corresponds to stimulation voltage 406, Csig corresponds to touch capacitance 502 and Cfb corresponds to feedback capacitor 410 of sense circuit 414 (assuming feedback resistor 412 is large). In the presence of offset capacitance 504, and assuming that the offset capacitance is significantly larger than touch capacitance 502, the transfer function can become:

$$V_s^* \, C_p/C_{fb} \tag{2}$$

where Cp corresponds to offset capacitance 504. As illustrated in equation 2, when offset capacitance 504 is larger than touch capacitance 502, the transfer function can become dominated by the offset capacitance to the extent that the touch capacitance can no longer be a factor in the transfer equation.

As far as the currents produced by the various capacitances in circuit 600, current 508 flowing in and out of offset capacitance 504 can be characterized as:

$$s^* C_p^* V_s \tag{3}$$

Referencing FIG. 6, output current 612 of cancellation circuit 601 can be characterized as:

$$s^* C_y^* \, V_s^* \, R_x/R_1 \tag{4}$$

where $C_y$ can correspond to capacitor 604, $R_x$ can correspond to feedback resistor 606 and $R_1$ can correspond to variable resistor 608.

As discussed previously, in order to cancel offset current 508 induced by offset capacitance 504, offset cancellation circuit 601 can produce a current that is substantially equal to the offset current. Using equations (3) and (4), a value of $R_1$—the variable resistor 608—can be chosen such that the result of equation (4) equals the result of equation (3). Setting $R_1$ such that equation (3) and equation (4) produce equal results can effectively cancel out the offset created by offset capacitance 504.

A self-capacitance touch sensor panel according to examples of this disclosure can include a plurality of touch electrodes, each electrode placed in geometric arrangements such that a touch occurring on the panel can be detected by at least one of the touch electrodes. In some examples, each touch electrode can be coupled to its own offset cancellation circuit to cancel the effects of parasitic capacitances. However, this can sometimes be cumbersome. For example, each cancellation circuit may require its own power source, thus diminishing the battery life of the device. Providing an offset cancellation circuit that can be shared by all of the electrodes can be beneficial.

Figure 7:
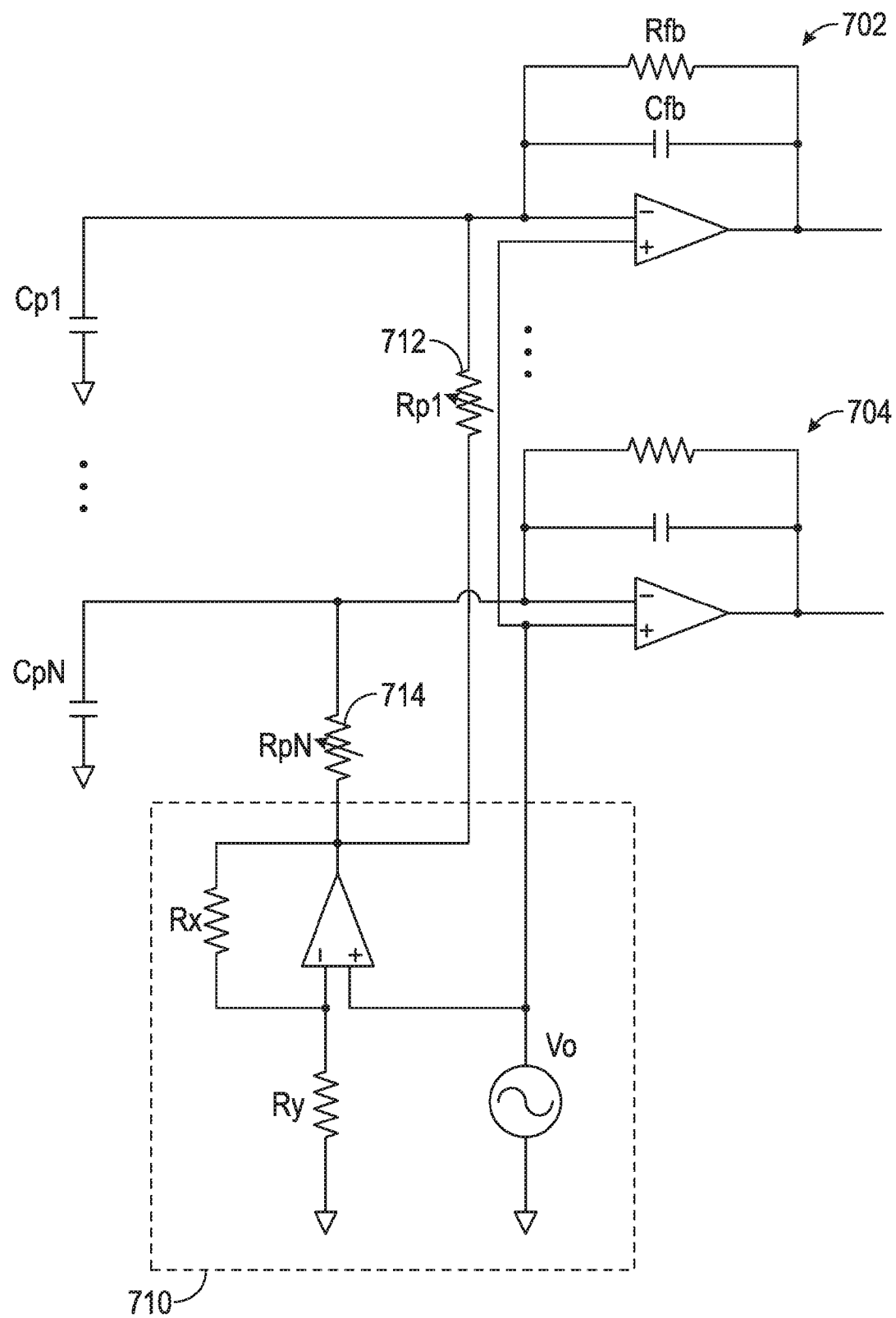
FIG. 7 illustrates multiple exemplary self-capacitance touch sensor electrodes with a common frequency independent offset cancellation circuit according to examples of the disclosure.

FIG. 7 illustrates multiple self-capacitance touch sensor electrodes with a common frequency independent offset cancellation circuit 710 according to examples of the disclosure. The touch sensor panel illustrated can include multiple self-capacitance electrode circuits, from the first electrode circuit 702 to the $N^{th}$ electrode circuit 704. Each electrode can be configured as described above in FIG. 4. In contrast to the example depicted in FIG. 6 in which one electrode can have its own dedicated offset cancellation circuit, in the example of FIG. 7, all of the electrodes can share a common offset cancellation circuit 710 that can be configured in substantially the same way as the cancellation circuit depicted in FIG. 6. Because each electrode may have varying amounts of parasitic capacitance coupled to it, each electrode can be coupled to its own variable resistor to control the amount of current flowing into each respective electrode to counteract the current created by each respective parasitic capacitance.

As an example, electrode 702 can be coupled to dedicated variable resistor 712, while electrode 704 can be coupled to dedicated variable resistor 714. During a calibration of the device in which there is no touch signal, each variable resistor of each electrode can be tuned such that substantially no touch signal is present on the output of the respective sense circuits of each electrode. In this way, the parasitic offset can be effectively "tuned" out such that during normal operation, a touch signal can appear at the output of each sense electrode with relatively little offset, thus maximizing performance of the touch sensor panel as a whole. In some examples, the above-described calibration can be performed by a processor, whether included on the touch sensor panel or located elsewhere, such as in a touch sensor panel subsystem.

Figure 8:
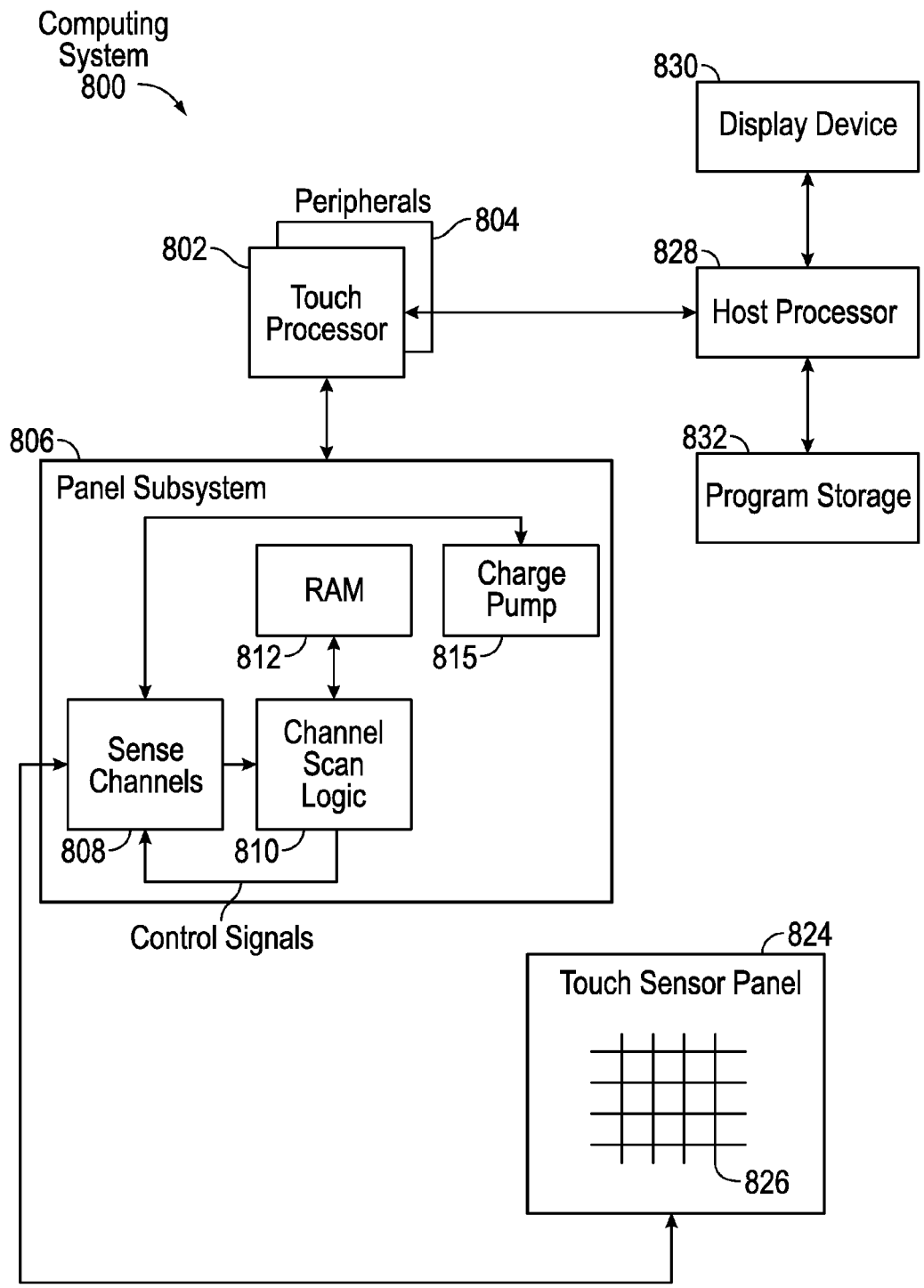
FIG. 8 illustrates an exemplary computing system including a touch sensor panel that includes a frequency independent offset cancellation circuit according to examples of the disclosure.

FIG. 8 illustrates exemplary computing system 800 that can include one or more of the example offset cancellation circuits described above. Computing system 800 can include one or more panel processors 802 and peripherals 804, and panel subsystem 806. Peripherals 804 can include, but are not limited to, random access memory (RAM) or other types of memory or storage, watchdog timers and the like. Panel subsystem 806 can include, but is not limited to, one or more sense channels 808 which can utilize operational amplifiers that can be configured to minimize saturation time, and channel scan logic 810. Channel scan logic 810 can access RAM 812, autonomously read data from the sense channels and provide control for the sense channels. In addition, channel scan logic 810 can control sense channels 808 to generate stimulation signals at appropriate frequencies and phases that can be selectively applied to the sense circuits coupled to electrodes 826 of touch sensor panel 824, as described above. In some examples, panel subsystem 806, panel processor 802 and peripherals 804 can be integrated into a single application specific integrated circuit (ASIC), and in some examples can be integrated with touch sensor panel 824 itself.

Touch sensor panel 824 can include a capacitive sensing medium having a plurality of electrodes 826, as described above, although other sensing media can also be used. Each electrode 826 can represent a capacitive touch node and can be viewed as a picture element, which can be particularly useful when touch sensor panel 824 is viewed as capturing an "image" of touch. Each electrode 826 of touch sensor panel 824 can be coupled to sense channel 808 (also referred to herein as an event detection and demodulation circuit) in panel subsystem 806.

Computing system 800 can also include host processor 828 for receiving outputs from panel processor 802 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/ or the like. Host processor 828 can also perform additional functions that may not be related to panel processing, and can be coupled to program storage 832 and display device 830 such as an LCD display for providing a UI to a user of the device. Display device 830 together with touch sensor panel 824, when located partially or entirely under the touch sensor panel, can form a touch screen. In some examples, display device 830 and touch sensor panel 824 can be integrated together.

Note that one or more of the functions described above, including the configuration of switches, can be performed by firmware stored in memory (e.g., one of the peripherals 804 in FIG. 8) and executed by panel processor 802, or stored in program storage 832 and executed by host processor 828. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 9A:
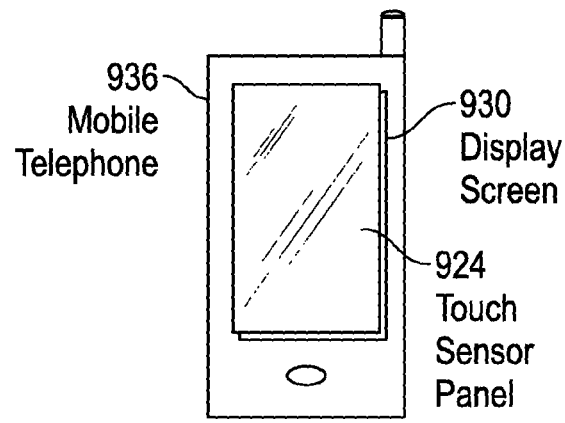
FIG. 9A illustrates an exemplary mobile telephone having a touch sensor panel that includes a frequency independent offset cancellation circuit according to examples of the disclosure.

FIG. 9A illustrates exemplary mobile telephone 936 that can include touch sensor panel 924 and display device 930, the touch sensor panel including a frequency independent offset cancellation circuit according to examples of the disclosure.

Figure 9B:
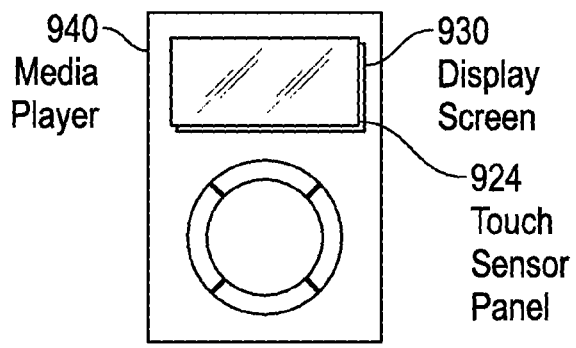
FIG. 9B illustrates an exemplary digital media player having a touch sensor panel that includes a frequency independent offset cancellation circuit according to examples of the disclosure.

FIG. 9B illustrates exemplary digital media player 940 that can include touch sensor panel 924 and display device 930, the touch sensor panel including a frequency independent offset cancellation circuit according to examples of the disclosure.

Figure 9C:
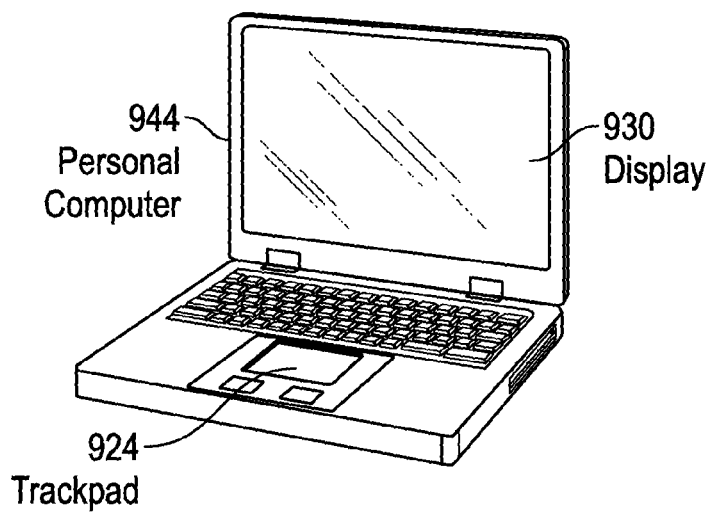
FIG. 9C illustrates an exemplary personal computer having a touch sensor panel that includes a frequency independent offset cancellation circuit according to examples of the disclosure.

FIG. 9C illustrates exemplary personal computer 944 that can include touch sensor panel (trackpad) 924 and display 930, the touch sensor panel including a frequency independent offset cancellation circuit according to examples of the disclosure.

Although FIGS. 9A-C illustrate a mobile telephone, a media player and a personal computer, respectively, the disclosure is not so restricted, and the touch sensor panel of this disclosure can be included on a tablet computer, a television, a wearable device, or any other device that can utilize a touch sensor panel that includes a frequency independent offset cancellation circuit according to examples of the disclosure.

Therefore, according to the above, some examples of the disclosure are directed to a self-capacitance touch sensor panel, the touch sensor panel comprising a plurality of touch electrodes; one or more sense circuits, the one or more sense circuits coupled to the plurality of touch electrodes; and at least one offset cancellation circuit, the at least one offset cancellation circuit coupled to at least one touch electrode of the plurality of touch electrodes and configured to generate an offset cancellation signal to cancel an offset signal at the at least one touch electrode. Additionally or alternatively to one or more of the examples disclosed above, in some examples, the offset cancellation circuit is configured to generate an offset cancellation current to cancel an offset current that is generated by an offset source coupled to the at least one touch electrode. Additionally or alternatively to one or more of the examples disclosed above, in some examples, the offset cancellation circuit comprises a variable resistor coupled to the at least one touch electrode, and a magnitude of the offset cancellation current is based on a resistance of the variable resistor. Additionally or alternatively to one or more of the examples disclosed above, in some examples, the touch sensor panel further comprises a processor configured to set the resistance of the variable resistor such that the offset cancellation current substantially cancels out the offset current of the at least one touch electrode. Additionally or alternatively to one or more of the examples disclosed above, in some examples, the touch sensor panel further comprises a stimulation source coupled to the offset cancellation circuit. Additionally or alternatively to one or more of the examples disclosed above, in some examples, the stimulation source is further coupled to the sense circuit of the at least one touch electrode. Additionally or alternatively to one or more of the examples disclosed above, in some examples, the stimulation source comprises a voltage source. Additionally or alternatively to one or more of the examples disclosed above, in some examples, the touch sensor panel further comprises a plurality of offset cancellation circuits, each of the plurality of touch electrodes being coupled to a respective one of the plurality of offset cancellation circuits. Additionally or alternatively to one or more of the examples disclosed above, in some examples, the offset cancellation circuit is coupled to each of the plurality of touch electrodes and is configured to generate the offset cancellation signal used to cancel offset signals of each of the respective touch electrodes. Additionally or alternatively to one or more of the examples disclosed above, in some examples, the touch sensor panel further comprises a stimulation source coupled to the offset cancellation circuit and each of the plurality of sense circuits of the plurality of touch electrodes. Additionally or alternatively to one or more of the examples disclosed above, in some examples, the touch sensor panel further comprises a plurality of variable resistors, each variable resistor coupled to the offset cancellation circuit and a respective one of the plurality of touch electrodes and used to generate a respective one of a plurality of offset cancellation currents to cancel offset currents of each of the respective touch electrodes.

Some examples of the disclosure are directed to a method comprising generating an offset cancellation signal using an offset cancellation circuit coupled to at least one touch electrode of a plurality of touch electrodes of a touch sensor panel, the offset cancellation signal being for cancelling an offset signal at the at least one touch electrode. Additionally or alternatively to one or more of the examples disclosed above, in some examples, generating comprises generating an offset cancellation current to cancel an offset current that is generated by an offset source coupled to the at least one touch electrode. Additionally or alternatively to one or more of the examples disclosed above, in some examples, the offset cancellation circuit comprises a variable resistor coupled to the at least one touch electrode, and a magnitude of the offset cancellation current is based on a resistance of the variable resistor. Additionally or alternatively to one or more of the examples disclosed above, in some examples, the method further comprises setting the resistance of the variable resistor such that the offset cancellation current substantially cancels out the offset current of the at least one touch electrode. Additionally or alternatively to one or more of the examples disclosed above, in some examples, the touch sensor panel further comprises a stimulation source coupled to the offset cancellation circuit. Additionally or alternatively to one or more of the examples disclosed above, in some examples, the stimulation source is further coupled to a sense circuit of the at least one touch electrode. Additionally or alternatively to one or more of the examples disclosed above, in some examples, the stimulation source comprises a voltage source. Additionally or alternatively to one or more of the examples disclosed above, in some examples, the method further comprises generating a plurality of offset cancellation signals using a plurality of offset cancellation circuits coupled to respective ones of the plurality of touch electrodes, the offset cancellation signals being for cancelling offset signals at the plurality of touch electrodes. Additionally or alternatively to one or more of the examples disclosed above, in some examples, the offset cancellation circuit is coupled to each of the plurality of touch electrodes, and generating comprises generating the offset cancellation signal used to cancel offset signals of each of the respective touch electrodes. Additionally or alternatively to one or more of the examples disclosed above, in some examples, the touch sensor panel further comprises a stimulation source coupled to the offset cancellation circuit and each of a plurality of sense circuits of the plurality of touch electrodes. Additionally or alternatively to one or more of the examples disclosed above, in some examples, the touch sensor panel further comprises a plurality of variable resistors, each variable resistor coupled to the offset cancellation circuit and a respective one of the plurality of touch electrodes, and generating comprises generating a plurality of offset cancellation currents using the plurality of variable resistors to cancel respective offset currents at each of the touch electrodes.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A self-capacitance touch sensor panel, the touch sensor panel comprising:
    a plurality of touch electrodes;
    one or more sense circuits, the one or more sense circuits coupled to the plurality of touch electrodes; and
    at least one offset cancellation circuit, the at least one offset cancellation circuit coupled to at least one touch electrode of the plurality of touch electrodes and configured to generate an offset cancellation current to cancel an offset current caused by a parasitic capacitance of the touch sensor panel at the at least one touch electrode, wherein the offset cancellation circuit includes a variable resistor coupled to the at least one touch electrode, and wherein the variable resistor is configured to be tuned until the offset cancellation current generated by the offset cancellation circuit is substantially equal in magnitude to the current caused by the parasitic capacitance.

2. The touch sensor panel of claim 1, further comprising:
a processor configured to set the resistance of the variable resistor such that the offset cancellation current substantially cancels out the offset current of the at least one touch electrode.

3. The touch sensor panel of claim 1, further comprising a stimulation source coupled to the offset cancellation circuit.

4. The touch sensor panel of claim 3, wherein the stimulation source is further coupled to the sense circuit of the at least one touch electrode.

5. The touch sensor panel of claim 3, wherein the stimulation source comprises a voltage source.

6. The touch sensor panel of claim 1, further comprising a plurality of offset cancellation circuits, each of the plurality of touch electrodes being coupled to a respective one of the plurality of offset cancellation circuits.

7. The touch sensor panel of claim 1, wherein the offset cancellation circuit is coupled to each of the plurality of touch electrodes and is configured to generate the offset cancellation signal used to cancel offset signals of each of the respective touch electrodes.

8. The touch sensor panel of claim 7, further comprising a stimulation source coupled to the offset cancellation circuit and one or more sense circuits of the plurality of touch electrodes.

9. The touch sensor panel of claim 7, further comprising a plurality of variable resistors, each variable resistor coupled to the offset cancellation circuit and a respective one of the plurality of touch electrodes and used to generate a respective one of a plurality of offset cancellation currents to cancel offset currents of each of the respective touch electrodes.

10. A method comprising:
tuning a variable resistor to generate an offset cancellation current using an offset cancellation circuit coupled to at least one touch electrode of a plurality of touch electrodes of a touch sensor panel, the offset cancellation current being for cancelling an offset current caused by a parasitic capacitance at the at least one touch electrode, and wherein the variable resistor is tuned until the offset cancellation current generated by the offset cancellation circuit is substantially equal in magnitude to the current caused by the parasitic capacitance.

11. The method of claim 10, wherein the touch sensor panel further comprises a stimulation source coupled to the offset cancellation circuit.

12. The method of claim 11, wherein the stimulation source is further coupled to a sense circuit of the at least one touch electrode.

13. The method of claim 11, wherein the stimulation source comprises a voltage source.

14. The method of claim 10, further comprising generating a plurality of offset cancellation signals using a plurality of offset cancellation circuits coupled to respective ones of the plurality of touch electrodes, the offset cancellation signals being for cancelling offset signals at the plurality of touch electrodes.

15. The method of claim 10, wherein:
the offset cancellation circuit is coupled to each of the plurality of touch electrodes, and
generating comprises generating the offset cancellation signal used to cancel offset signals of each of the respective touch electrodes.

16. The method of claim 15, wherein the touch sensor panel further comprises a stimulation source coupled to the offset cancellation circuit and one or more sense circuits of the plurality of touch electrodes.

17. The method of claim 16, wherein
the touch sensor panel further comprises a plurality of variable resistors, each variable resistor coupled to the offset cancellation circuit and a respective one of the plurality of touch electrodes, and
generating comprises generating a plurality of offset cancellation currents using the plurality of variable resistors to cancel respective offset currents at each of the touch electrodes.

* * * * *